ered Staten Patent [19] [11] 3,880,932
Anderson et al. [45] Apr. 29, 1975

[54] 4-(2-NAPHTHYL)-4-ALKYL-3-BUTEN-2-ONES

[75] Inventors: Paul L. Anderson, Dover, N.J.;
Darryl A. Brittain, New York, N.Y.

[73] Assignee: Sandoz-Wander, Inc., Hanover, N.J.

[22] Filed: Aug. 20, 1973

[21] Appl. No.: 390,033

[52] U.S. Cl. ......... 260/590; 260/611 F; 260/649 R; 424/331; 424/337; 424/340; 424/353
[51] Int. Cl... C07c 49/76; C07c 49/80; C07c 49/82
[58] Field of Search ...................................... 260/590

[56] References Cited
UNITED STATES PATENTS
2,932,652  4/1960  Molnar .............................. 260/590

Primary Examiner—Daniel D. Horwitz
Attorney, Agent, or Firm—Gerald D. Sharkin; Richard E. Vila; Frederick H. Weinfeldt

[57] ABSTRACT

The compounds are 4-naphthyl-4-lower alkyl-substituted -3-buten-2-ones, and -2-halo-1,3-butadienes, e.g., 2-[2-(6-methoxynaphthyl)]-2-penten-4-one, and are useful as pharmaceuticals.

5 Claims, No Drawings

4-(2-NAPHTHYL)-4-ALKYL-3-BUTEN-2-ONES

This invention relates to chemical compounds, and more particularly to 1-alkyl-1-naphthyl-substituted-butenes, and to the preparation of such compounds, as well as to pharmaceutical compositions containing such compounds and the use of such compounds.

The compounds of this invention may be conveniently represented by the formula I

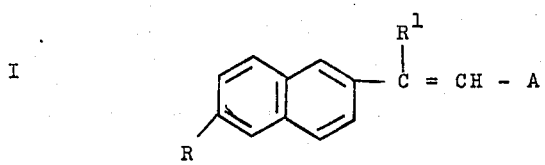

wherein R
is a hydrogen atom or halo having an atomic weight of from about 19 to 80, i.e., fluoro, chloro or bromo, lower alkyl, lower alkoxy, lower alkylthio, or difluoromethoxy;

$R^1$ is lower alkyl, e.g., having from one to three carbon atoms, such as methyl, ethyl, n-propyl and isopropyl; and A is either of the structures:

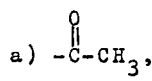

i.e., an acetyl function; or

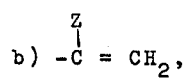

wherein Z is halo having an atomic weight of from about 35 to 80, i.e., chloro or bromo.

As used in the definitions of R, above, the terms lower alkyl, lower alkoxy and lower alkylthio, the alkyl portions thereof have, e.g. from one to four carbon atoms, such as methyl, ethyl, propyl or butyl, including isomeric forms where such exist.

Thus, Compounds I comprise two subclasses, depending upon the nature of A; $R^1$, R and Z being as defined above:

Ia
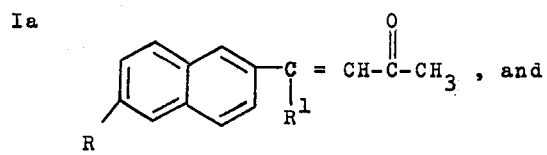, and

Ib
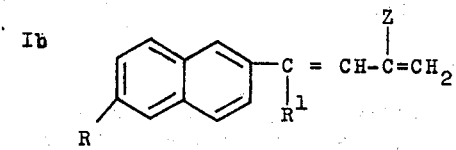.

Compounds Ia may be obtained by acidic treatment [Process (a)] of an appropriate butadienol of the formula II II 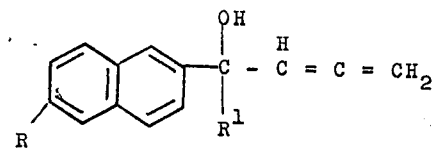

wherein R and $R^1$ are as defined above.

Process (a) involves acidic treatment of a compound II to obtain the corresponding Compound Ia, and may be carried out employing as the "acidic" source a strong protonating agent in the presence of hydroxy, (lower) acyloxy or (lower) alkoxy anion, in a suitable medium, at moderate temperatures, e.g., 10° to 100°C., preferably at 15° to 35°C. Where the hydroxy, (lower) acyloxy or (lower) alkoxy contributing agent is a liquid under the process conditions, it may be used in excess to serve as the medium.

Strong protonating agents include mineral acids, such as hydrochloric or hydrobromic, or sulfuric acid, and aromatic- or (lower) aliphatic sulfonic acids, such as p-toluenesulfonic acid. Suitable hydroxy, (lower) acyloxy, e.g., having two to four carbon atoms, and (lower) alkoxy anion, e.g., having from one to four carbon atoms, contributing agents include lower alkanols, such as methanol, esters such as ethyl orthoformate, or organic acids or anhydrides, such as acetic acid or acetic anhydride, singly or in mixtures.

If the hydrochloric or hydrobromic acid is employed as the acidic source in process (a), then in addition to the corresponding Compound Ia product, a corresponding Compound Ib wherein Z is accordingly either chloro or bromo, will be obtained as a co-product. Thus, by selection of reagents, either Compounds Ia or both classes of Compounds I may be obtained, as may be conveniently represented by Reaction Scheme A, wherein R, $R^1$, and Z are as defined above. When both compounds Ia and Ib are produced, they may be separated from each other and individually recovered by conventional recovery procedures, e.g., fractional crystallization or chromatographic techniques.

REACTION SCHEME A

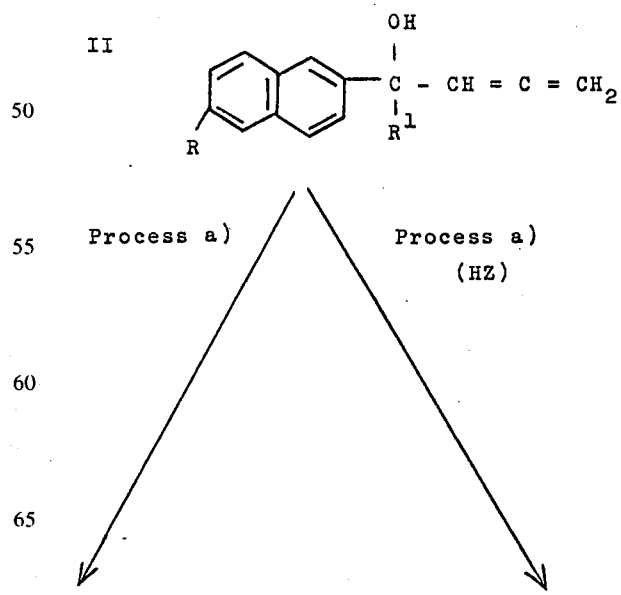

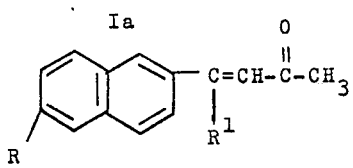

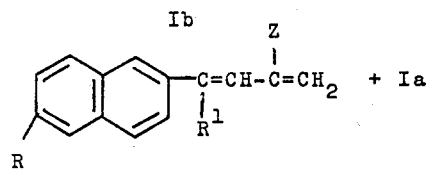

Compounds II, the starting materials of Process (a) are either known compounds or analogs of known compounds and are obtainable by adaption of the methods described in the literature for the preparation of such compounds, e.g., the Belgian patent issuing on Belgian Application No. 124,754 (filed Nov. 29, 1972 and claiming priority of U.S. application Ser. No. 203,825 filed Dec. 1, 1971).

The compounds of formula I are useful because they possess pharmacological activity in animals. In particular, the compounds I are useful as anti-inflammatory agents as indicated by the Carrageenan induced edema test on rats (oral administration at 5 to 200 mg./kg.). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 0.5 milligram to about 175 milligrams per kilogram of body weight, preferably given in divided doses two to four times a day, or in sustained release form. For most mammals the administration of from about 30 milligrams to about 2,000 milligrams of the compound per day provides satisfactory results and dosage forms suitable for internal administration comprise from about 8 milligrams to about 1,000 milligrams of the compound in admixture with a solid or liquid pharmaceutical carrier or diluent.

As noted above, oral administration with carriers may take place in such conventional forms as tablets, dispersible powders, granules, capsules, syrups and elixirs. Such compositions may be prepared according to any method known in the art for manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert diluent, e.g., a solid diluent such as calcium carbonate, calcium phosphate and kaolin or a liquid diluent such as a polyethylene glycol. The preferred pharmaceutical compositions from the standpoint of preparation and ease of administration are orally administrable compositions, particularly tablets and liquid or solid diluent-filled capsules Representative formulations of a tablet and a capsule prepared by conventional techniques are as follows:

| Ingredient | Weight Tablet | Capsule |
| --- | --- | --- |
| 2-[2-(6-methoxynaphthyl)]-2-penten-4-one | 50 | 50 |
| Tragacanth | 10 | |
| Lactose | 197.5 | 250 |
| Corn Starch | 25 | |
| Talcum | 15 | |
| Magnesium Stearate | 2.5 | |

In the following examples, which illustrate the invention, temperatures are in degrees centigrade, and room temperature is 20° to 30°C., unless indicated otherwise.

EXAMPLE

2-[2-(6-methoxynaphthyl)]-2-penten-4-one

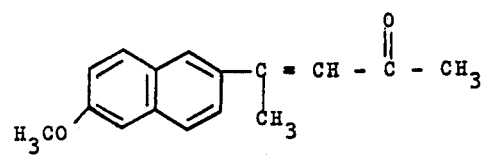

and 2-[2-(6-methoxynaphthyl)]-4-chloro-2,4-pentadiene

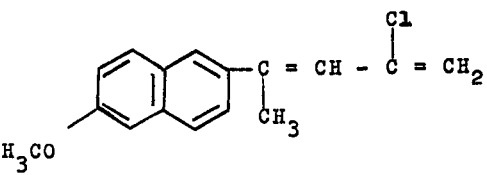

To a solution of 10 g. of 2-[2-(6-methoxynaphthyl)]-3,4-pentadien-2-ol* in 200 ml. of anhydrous methanol is added 3 ml. of concentrated hydrochloric acid (12N). The mixture is stirred at room temperature for 3 hours and then at ice bath temperature for 2 hours. The solid which forms is filtered off and recrystallized from pentane to give 2-[2-(6-methoxynaphthyl)]-2-penten-4-one,**m.p. 108°–109°C.

*may also be designated 2-(6'-methoxy-2'-naphthyl)3,4-pentadiene2-ol.

**may also be designated 4-(6-methoxy-2-naphthyl)-3-penten

Evaporation of the filtrate gives an oil which upon separation and purification via preparative thin layer chromatography yields 2-[2-(6-methoxynaphthyl)]-4-chloro-2,4-pentadiene, m.p. 86°–88°C. which may also be designated 4-[2-(6-methoxynaphthyl)]-2-chloro-1,3-pentadiene.

Repeating the procedure of this example, but using in place of the 2-[2-(6-methoxynaphthyl)]-3,4-pentadien-2-ol, an equivalent amount of the compound of column A there is similarly obtained the compounds of columns B and C:

| | A | B | C |
|---|---|---|---|
| a) | 2-[2-(6-chloronaphthyl)]-3,4-pentadien-2-ol | 2-[2-(6-chloronaphthyl)]-2-penten-4-one | 2-[2-(6-chloronaphthyl)]-4-chloro-2,4-pentadiene |
| b) | 2-(2-naphthyl)-3,4-pentadien-2-ol | 2-(2-naphthyl)-2-penten-4-one | 2-(2-naphthyl)-4-chloro-2,4-pentadiene |
| c) | 3-[2-(6-methoxynaphthyl)]-2-methyl-4,5-hexadien-3-ol | 3-[2-(6-methoxynaphthyl)]-2-methyl-3-hexen-5-one | 2-[2-(6-methoxynaphthyl)]-2-methyl-5-chloro-3,5-hexadiene |
| d) | 3-[2-(6-methoxynaphthyl)]-4,5-hexadien-3-ol | 3-[2-(6-methoxynaphthyl)]-3-hexen-5-one | 2-[2-(6-methoxynaphthyl)]-5-chloro-3,5-hexadiene |
| e) | 2-[2-(6-difluoromethoxynaphthyl)]-3,4-pentadien-2-ol | 2-[2-(6-difluoromethoxynaphthyl)]-2-penten-4-one | 2-[2-(6-difluoromethoxynaphthyl)]-4-chloro-2,4-pentadiene |
| f) | 2-[2-(6-n-butylnaphthyl)]-3,4-pentadien-2-ol | 2-[2-(6-n-butylnaphthyl)]-2-penten-4-one | 2-[2-(6-n-butylnaphthyl)]-4-chloro-2,4-pentadiene |
| g) | 2-[2-(6-methylthionaphthyl)]-3,4-pentadien-2-ol | 2-[2-(6-methylthionaphtyl)]-2-penten-4-one | 2-[2-(6-methylthionaphthyl)]-4-chloro-2,4-pentadiene |
| h) | 2-[2-(6-ethoxynaphthyl)]-3,4-pentadien-2-ol | 2-[2-(6-ethoxynaphthyl)]-2-penten-4-one | 2-[2-(6-ethoxynaphthyl)]-4-chloro-2,4-pentadiene |

What is claimed is:

1. A compound of the formula

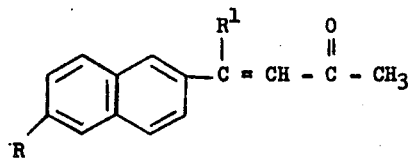

wherein

R is a hydrogen atom, halo having an atomic weight of from about 19 to 80, difluoromethoxy, alkyl having from one to four carbon atoms, alkoxy having from one to four carbon atoms, or alkylthio having from one to four carbon atoms; and $R^1$ is alkyl having from 1 to 3 carbon atoms.

2. A compound of claim 1 wherein $R^1$ is methyl.

3. A compound of claim 1 wherein R is alkoxy.

4. The Compound of claim 3 wherein R is methoxy and $R^1$ is methyl.

5. A compound of claim 1 wherein

R is halo having an atomic weight of from about 19 to 80, difluoromethoxy, alkyl having from one to four carbon atoms, alkoxy having from one to four carbon atoms, or alkylthio having from one to four carbon atoms; and $R^1$ is as defined.

* * * * *